United States Patent
Bergmann et al.

[19]

[11] Patent Number: 5,944,356
[45] Date of Patent: Aug. 31, 1999

[54] IDENTITY CARD WITH A HUMANLY VISIBLE AUTHENTICITY FEATURE

[75] Inventors: Matthias Bergmann, München; Horst Henkenschuh, Asbach-Bäumenheim; Reinhard Krusche, München; Joseph Riedl, Attenkirchen, all of Germany

[73] Assignee: GAO Gesellschaft für Automation und Organisation, Munich, Germany

[21] Appl. No.: 08/464,772

[22] PCT Filed: Dec. 23, 1993

[86] PCT No.: PCT/EP93/03673

§ 371 Date: Oct. 23, 1995

§ 102(e) Date: Oct. 23, 1995

[87] PCT Pub. No.: WO94/15319

PCT Pub. Date: Jul. 7, 1994

[30] Foreign Application Priority Data

Dec. 23, 1992 [DE] Germany ............................. 42 43 987

[51] Int. Cl.⁶ ...................................................... B42D 15/00

[52] U.S. Cl. ............................... 283/86; 283/109; 283/111
[58] Field of Search .................................. 283/72, 86, 85, 283/87, 91, 109, 117, 111

[56] References Cited

U.S. PATENT DOCUMENTS

| | | | |
|---|---|---|---|
| 4,748,452 | 5/1988 | Maurer | 283/86 |
| 4,971,646 | 11/1990 | Schell et al. | 283/86 X |
| 5,331,443 | 7/1994 | Stanisci | 283/86 X |
| 5,421,619 | 6/1995 | Dyball | 283/86 X |
| 5,496,072 | 3/1996 | Yamauchi et al. | 283/86 |
| 5,513,019 | 4/1996 | Cueli | 283/86 X |
| 5,634,669 | 6/1997 | Colgate, Jr. | 283/86 X |

Primary Examiner—Willmon Fridie, Jr.
Attorney, Agent, or Firm—Andrus, Sceales, Starke & Sawall

[57] ABSTRACT

A multilayer data carrier is described which bears general printed data and furthermore has a transparent layer containing additives which are absorbent for a laser beam. The transparent layer is designed so that it exists in the card compound as a thin, nonself-supporting layer.

29 Claims, 4 Drawing Sheets

IDENTITY CARD WITH A HUMANLY VISIBLE AUTHENTICITY FEATURE

This invention relates to a multilayer data carrier bearing general printed data, having at least one opaque layer and at least one transparent layer containing additives which are absorbent for a laser beam, whereby information is incorporated in the transparent layer by means of a laser beam in the form of local changes in the optical properties of the layer.

Data carriers in the form of identity cards, credit cards, bank cards, cash cards and the like are used to an increasing extent in a great variety of services sectors, for example in cashless money transfer and in the in-company area. On the one hand they are typical mass-produced articles due to their widespread use; their manufacture, i.e. production of the card structure and incorporation of the card-specific user data, must be simple and cost-effective. On the other hand the cards must be designed so as to be protected against forgery and falsification to the greatest possible degree. The many types of identity cards already on the market and still in the developmental stage reflect the efforts of the relevant industry to optimize these two contrary conditions.

DE-C 31 51 407 discloses for example an identity card wherein a plastic layer is provided in the card as a recording medium which appears completely transparent when viewed normally but absorbs the light of a laser beam so strongly that the laser beam causes blackening in the film. Pictures or data can thus be incorporated in the basically transparent layers in tamper-resistant fashion in the last processing step. The film suitable for laser inscription can be used either as a cover layer over the so-called card inlay or together with other transparent cover films which also appear transparent for the laser pencil. Although the identity card presented in DE-C 31 51 407 already has a high measure of resistance to forgery there are still efforts to broaden the possibilities of designing the card with respect to its visual impression and to impede falsification and total forgery of cards further by introducing additional authenticity features that are reproducible only with high technical effort.

It is thus proposed e.g. in EP-C 0 219 012 to incorporate a transparent layer suitable for laser inscription in the identity card and to cover this layer by a cover layer that is transparent both in the visual range and for the laser pencil. This layer is provided in a partial area with a lenticular screen. The layer suitable for laser inscription is inscribed by a laser through this lenticular screen. The lenticular screen focuses the laser in the layer suitable for laser inscription so that rod-shaped blackenings arise in this layer that penetrate the total thickness of the layer. If the transparent layer suitable for laser inscription is provided with data by the laser beam through the lenticular screen at various angles in this way, images arise in this layer that are fundamentally visible only at this angle. When the thus inscribed card is rotated about the particular card axis one can observe a so-called "tilt effect" since the laser-inscribed data are only visible at times during rotation.

Finally it is known from EP 0 219 011 to provide identity cards with several transparent films suitable for laser inscription. These films are selected so that it is possible to incorporate data by means of a laser beam in several layers simultaneously or only in one individual layer selectively, whereby these pieces of information can also be separated from one other by a transparent intermediate area. By suitably selecting the films it is e.g. also possible to incorporate an uninterrupted image in a film whereas the same image is simultaneously incorporated in the other film with an interruption.

The above publications have in common that information is inscribed by means of a laser beam in one or more transparent films which are suitable for laser inscription, i.e. accordingly sensitized.

The thickness of the layer suitable for laser inscription is given by the thickness of the sensitized film. In the above-mentioned cards with a tilt or parallax image it is advantageous if the laser inscription is designed as thinly as possible to avoid overlapping of the individual tilt or parallax images at certain viewing angles. During production of cards it is no longer possible to handle the film with a thickness of less than 50 microns, so that this also determines the minimum thickness of inscription. This does not permit production of tilt or parallax images without disturbing overlapping of the individual partial pictures at various viewing angles. Furthermore the minimum thickness of laser inscription limits the obtainable picture definition in all cards to be inscribed.

The film is sensitized for laser radiation by special additives which are incorporated in the basically transparent film in a concentration that impairs the transparency of the film as little as possible but provides sufficient absorption centers for the laser energy where discoloration of the film material or the material transformation can begin.

The invention has as an object providing a multilayer identity card with laser inscription wherein the inscription has improved sharpness and resolution.

The basic idea of the invention is to provide a layer containing at least one additive in the card structure of a multilayer data carrier, this layer being thin in relation to the other layers of the data carrier. This layer can be incorporated at virtually any place in the layer structure. The layer as such is nonself-supporting, i.e. it is not processible as a separate layer but only together with a thicker carrier layer which is laminated with further layers into a multilayer data carrier. The small thickness of the layer permits laser inscription which is limited to an extremely small volume area relative to the card thickness.

The advantage obtainable with the invention is in particular that the use of the inventive layer makes it possible to obtain a sharply delimited, clearly contoured laser inscription of the data carrier. In a card with tilt or parallax images, for example, the individual images can be distinguished from one other much better at different viewing angles so that their optical effect is improved. The sensitizing of plastics is known and described for example in EP-C 0 232 502 and EP-C 0 190 997.

In a preferred embodiment the thin, nonself-supporting layer is disposed in the interior of the card so that it is protected from environmental influences or influences resulting from daily use of the data carrier. It has proved to be particularly advantageous to cover the thin, nonself-supporting layer with a transparent layer that can also bear the general printed data on its inner side.

In a further special embodiment the inventive layer consists of a sensitized layer of lacquer, which permits further advantages to be obtained. Much higher flexibility is thus given in the production of the card since the layers of lacquer can be produced separately from the film production and incorporated in the card structure in almost any step of the card production. Since the composition of the layers of lacquer and thus also their laser sensitization properties are variable at short notice one can also consider modifications of the layer of lacquer at short notice during card production independently of the stock keeping of the films. Along with conventional all-over application of the layers of lacquer one can now also sensitize partial areas of the card with layers of lacquer, whereby these layers can also be applied in the form of an image or pattern. The limits to the possibilities are determined only by the limits of printing technology. Several layers of lacquer can thus also be disposed one above the other or different lacquers combined with one other so that e.g. differently sensitized surface areas are realizable in different card areas. Since the layers of lacquer are applicable in almost any layer thickness only accordingly smaller volume areas of the cards are "discolored" during laser inscription if very thin layers are used, which is reflected positively not only in increased inscription sharpness but also in a lower demand for laser energy and higher inscription speed.

Using layers of lacquer sensitized for laser inscription one can thus realize all applications that were hitherto possible with accordingly sensitized films. One can thus produce tilt images or parallax images as are described in the published patent documents mentioned at the outset. Since the layers of lacquer can be provided in almost any desired thinness while the plastic films hitherto used, however, the data can be inscribed with a much higher resolution. This manifests itself in particularly positive fashion in the incorporation of tilt images or parallax images since the information is "tilted" in much smaller angle ranges, on the one hand, and the pieces of information incorporated at different angles can be separated from one other much more exactly.

In a further embodiment the inventive layer consists of a thin sensitized polymer layer which has been coextruded together with at least one further polymer layer. Modern extruders make it possible to extrude several, even different, polymer layers simultaneously whereby the thickness of the individual layers can be adjusted separately. It is thus possible to produce very thin sensitized film layers that can be handled due to the thicker coextruded carrier layer.

Further properties and advantages of the invention can be found in the following description of various embodiment examples, which will be explained in more detail with reference to the Figures. A true-to-scale reproduction was dispensed with in favor of greater clarity.

Figure 1:
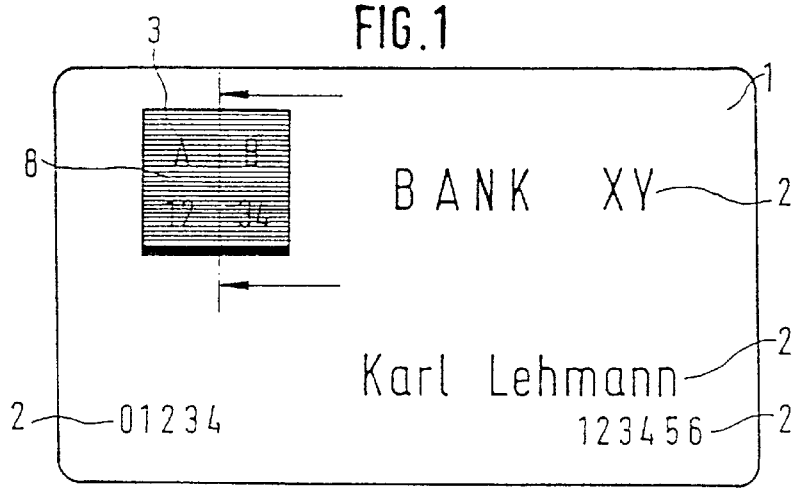
FIG. 1 shows a front view of a card with schematically indicated "laser data"

FIG. 1 shows conventional card 1 from the front, wherein alphanumeric data 2, for example, are burned into the interior of the card by means of a laser beam so as to be recognizable to the viewer at any angles of view, and user-related data 3 are provided in the area of a so-called tilt image. Data 3 are incorporated in schematically shown lenticular screen field 8 at different angles so that they are not recognizable simultaneously when checked, contrary to the graphic representation, but only at the particular angles at which inscription was performed. Further details on this can be found in EP-C 219 012, to which explicit reference is made in this connection.

Figure 2:
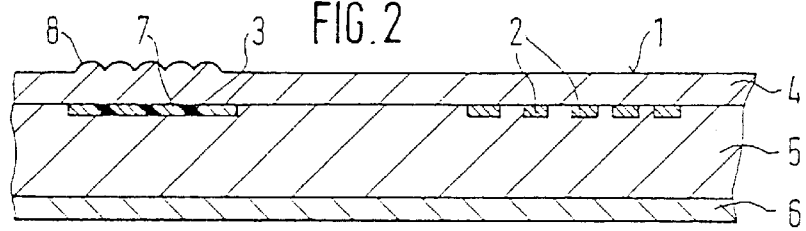
FIGS. 2 to 13 show cross-sectional views of various multilayer cards.

FIG. 2 shows a card structure corresponding to FIG. 1 again in cross section. Card 1 thus comprises transparent upper cover film 4, opaque inlay 5 and lower transparent cover film 6. The upper cover film has lenticular screen 8 with layer of lacquer 7 sensitized for laser inscription disposed therebelow. In layer of lacquer 7 data are inscribed by means of the laser beam which are recognizable as a so-called tilt image. Along with tilt image data 3 abovementioned alphanumeric data 2 are burned into the surface of inlay 5.

Layer of lacquer 7 is made relatively thin. Layer thicknesses between 1 micron and about 50 microns appear useful in this connection. Experiments have shown that layer thicknesses in the range of 5 to 20 microns permit both particularly good laser inscription with high selectivity and good contrast, and good discrimination of the individual tilt images.

Layer of lacquer 7 can be incorporated during card production either by being printed on the underside of cover film 4 or on the surface of inlay 5.

Figure 3:
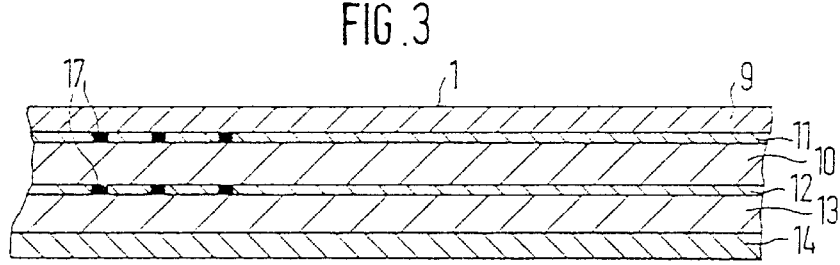

FIG. 3 shows a further card structure provided with two superjacent layers of lacquer 11, 12 suitable for laser inscription that are used together with two transparent cover films 9, 10. This four-layer structure 9, 10, 11, 12 is applied to opaque inlay 13 which has further transparent cover film 14 provided on its back. In a card with such a structure one can incorporate parallax images particularly easily as are already known from EP-C 219 011. The parallax effect is also very positively influenced in this card structure by the use of extremely thin layers of lacquer 11, 19 since the sharpness of the laser recording permits particularly good separation of the structures.

Figure 4:
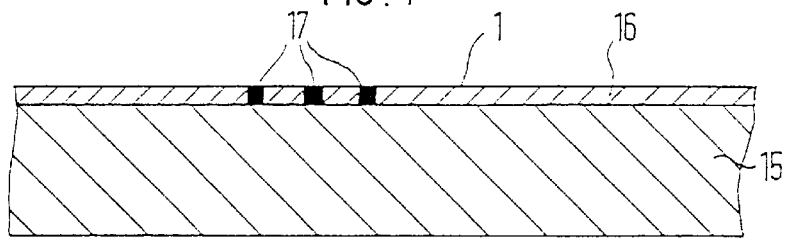

FIG. 4 shows a card with a particularly simple structure. In this card, layer of lacquer 16 sensitized for laser inscription is applied to relatively thick card base 15. Layer of lacquer 16 is in this case directly accessible and must thus be made particularly resistant. It proves to be a particular advantage of this card structure that it can be produced by simply lacquering base 15 without the plastic material of base 15 needing to have any special laser inscription properties. Laser inscription 17 can be provided solely in layer of lacquer 16 if the laser energy is dimensioned accordingly. By increasing the laser power, however, one can also produce a simultaneous inscription in the surface of card base 15.

Figure 5:
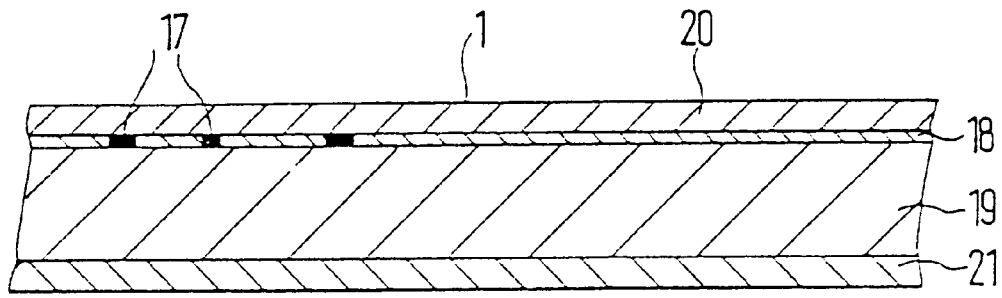

FIG. 5 shows a card in which layer of lacquer 18 is covered with transparent cover film 20. Both layers are disposed above opaque card inlay 19. On the back of card inlay 19 further transparent cover film 21 is provided. Laser inscription data 17 incorporated in layer of lacquer 18 are removed from direct access by cover film 20 located thereabove, and thus protected to a high degree from forgery and falsification.

Figure 6:
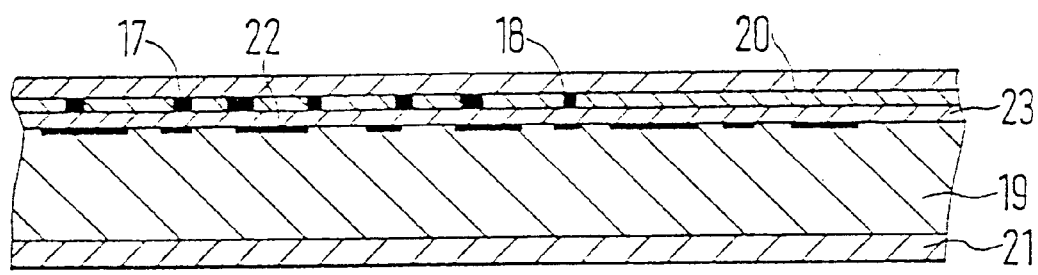

FIG. 6 shows a card in which layer of lacquer 18 is disposed between two transparent cover layers 20 and 23. This altogether transparent compound film is disposed on card inlay 19 which bears printed image 22. Laser inscription data 17 are quasi embedded in the interior of the cover film in this card structure and are separate from printed image 22 in visually recognizable fashion. The viewer can see laser inscription data 17 "floating" above printed data 22, in particular when he views the card on a slant. This effect is clearer the thicker transparent layer 23 is. In the extreme case opaque layer 19 can even be dispensed with so that virtually the total card thickness is formed by transparent layer 23. Printed image 22 is located almost on the opposite surface of the card with this card structure.

Figure 7:
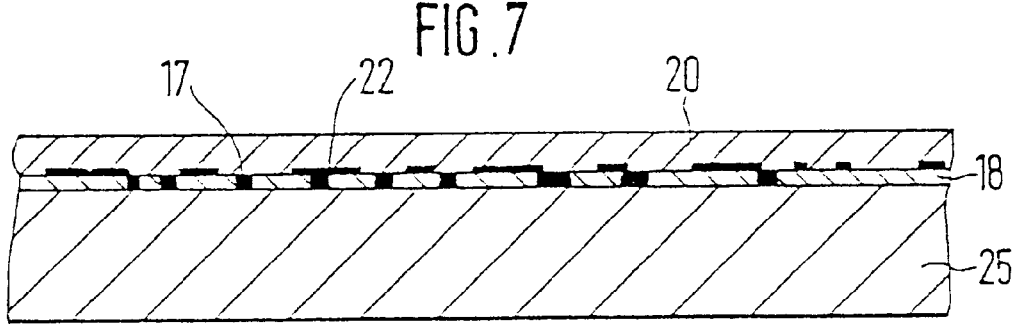

FIG. 7 shows an identity card in which printed image 22 is disposed on the back of transparent cover film 20. This film thus printed is laminated on opaque base 25 which is provided with layer of lacquer 18. When data 17 are inscribed in layer of lacquer 18 of this card structure with the aid of the laser pencil these data are disposed in the card structure under printed image 22. Attempts to remove data 17 thus always lead to destruction of the printed image, which makes manipulation virtually impossible if the design is accordingly complicated (guilloches, etc.). Since parts of printed image 22 are hit by the laser beam during inscription of the laser data the printed image itself is locally destroyed at these places in such cases along with the inscription in layer of lacquer 18. In an intact card this is not recognizable to the viewer since the laser inscription conveys a homogeneous impression. In the layer structure itself, however, the laser inscription data are burned in this way both into printed image 22 and into layer of lacquer 18. By accordingly increasing the laser energy one can also extend this effect into card base 25, as already mentioned.

The stated embodiment examples show that the layers of lacquer are to be taken into consideration in the card structure in a great variety of forms and that different effects are obtainable depending on the specific embodiment. The number of possibilities of combination is of course not exhausted by the stated embodiment examples; in particular one can produce a local increase in laser sensitization by selectively disposing layers of lacquer having the same or different degrees of sensitization above one another. The layer of lacquer can be applied either all over or in a pattern so that additional effects can be obtained in the card structure and in the card inscription.

When composing the sensitized layer of lacquer one can vary a great number of parameters, so that an optimally inscribable layer of lacquer can be composed for the particular card material used. The following specific parameters can be varied:

1. the solvent (tetrahydrofuran, cyclohexanone, ethyl methyl ketone, etc.),
2. the vehicle (PVC, PC, polyester, etc.),
3. the sensitizing substance,
4. the layer thickness of the lacquer (10 to 150 microns wet film),
5. various possibilities of combining the type of lacquer and the film material (e.g. polyester and PVC),
6. the manner of application (doctoring, printing, spraying, pouring, etc.),
7. the position of the layer of lacquer in/on the card,
8. the use of a dispersion lacquer.

From the great number of possible combinations one possible embodiment will be shown with reference to an example.

Production of Lacquer

In 340 g cyclohexanone 0.08 a carbon black is dispersed in an ultrasonic bath in the course of 5 minutes. To this dispersion 60 g PVC with a K value of more then 50 is added and dissolved in heat.

Application

The lacquer produced by the above general method and containing the additive carbon black (200 ppm) is now applied to a PVC film by means of a doctor blade in a wet film thickness of 75 microns and dried. This lacquered film is laminated with further films transparent for a laser beam into a card by the conventional methods so that the layer of lacquer comes to lie under a transparent film in the interior of the card.

Incorporation of Laser Impression

The card produced by the above general method and containing a sensitized lacquer is irradiated by light pulses in the path of rays of a Nd-YAG pulse laser. An intensive black coloring arises. Inscription thereby takes place in the layer of lacquer.

For the selection of vehicles in the lacquers it has in particular turned out to be unnecessary to use those polymeric substances as a vehicle which are at least chemically similar to the base polymer in the bordering layer, although this may be advantageous. It is furthermore favorable to use polymers with a relatively high molecular weight, contrary to the customary practice. This firstly improves the obtainable blackening at the same laser energy and secondly increases the adhesion between the sensitized layer of lacquer and a bordering film layer. When formulating the lacquer it has proven favorable for inscribability and the compound of the layers to select the molecular weight of the polymeric vehicle so that a solids content of 20% is not exceeded in the saturated solution. For PVC one can use materials with a K value of more than 50, for polycarbonate (PC) polymers with a molecular weight of more than 10,000 g/mol. The layers of lacquer have a particularly good inscribability when their vehicles consist of homopolymers with as little plasticizer as possible. However copolymers are also suitable provided the comonomer has no plasticizer property, e.g. has an acrylate base.

Along with these lacquers with polymeric vehicles of high molecular weight, however, it is also possible to use sensitized dispersion lacquers which usually consist of a solid, a nonsolvent, a dispersing agent and, if required, also a solvent.

It has likewise proved possible to use sensitized so-called coating powders, which are fine-grained binding systems without a vehicle. Coating powders are applied to the layer of a identity card, for example, by being electrostatically charged and sprayed onto the substrate to be lacstatically charged and sprayed onto the substrate to be lacquered. The high particle velocity of the lacquer particles causes the polymeric powder to adhere to the film and bond into a continuous layer of lacquer during the laminating process.

Since the adhesion of the film layer of the card bordering on the layer of lacquer is reduced by the local carbonization of the layer of lacquer in the lasered areas, it is favorable to improve the adhesion of the laminar compound by using a layer of lacquer consisting of a mixture of a first lacquer with a second lacquer, whereby the second lacquer does not interact with the laser beam. In these lacquer mixtures the two lacquers are preferably chemically different, e.g. acrylate lacquer and PVC lacquer, whereby only one of the lacquers contains additives. This measure retains the adhesion between the layer of lacquer and the bordering film layer of the card since at least one layer of lacquer is transparent for the laser beam, undergoes no material transformation and thus guarantees a firm compound between layer of lacquer and bordering film layer.

Figure 8:
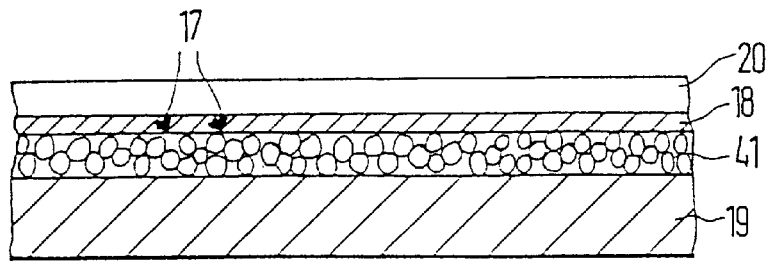

A further embodiment of the invention is shown in FIG. 8. Porous layer 41 to which layer of lacquer 18 is applied is located here on opaque core layer 19. The layer of lacquer can be additionally covered with a transparent cover layer. The special advantage of the arrangement is that porous layer 41 can absorb the gases arising during laser inscription so that the formation of gas during laser inscription is compensated by the porous base and no cracks arise.

In a further preferred embodiment the sensitized layer is produced in a compound with at least one further film layer as a so-called coextruded film. By jointly, simultaneously extruding several film materials one produces a film compound wherein at least one layer of the coextruded film is provided with additives which permit laser inscription. The thin sensitized layer can thus be processed together with at least one coextruded layer like a customary film. The layer provided with additives typically has a thickness of 5 to 50 microns.

Figure 9:
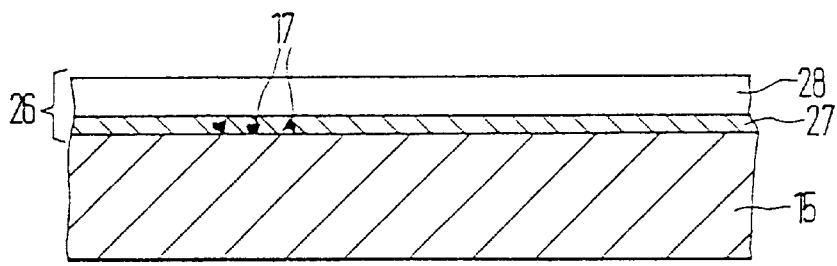

FIG. 9 shows an identity card comprising card base 15, which can contain printed data, and coextruded film 26 located thereabove. The coextruded film in turn comprises two plastic layers of which layer 27 is sensitized for laser inscription. Since the laser-sensitized layers can be varied in almost any areas within a coextruded film it is also possible to produce the layer thickness of less than 50 microns necessary for clear inscription.

If the coextruded materials are selected accordingly the coextruded film can also be laminated on the card body the other way around so that thin, nonself-supporting layer 27 is located on the outside. In this case it is possible to print layer 27. Layer 27 is usually protected from environmental influences by a further transparent layer. The laser data can be inscribed before or after application of the additional transparent layer, whereby lasering can also take place through the printed image if the ink is transparent for the laser beam.

Figure 10:
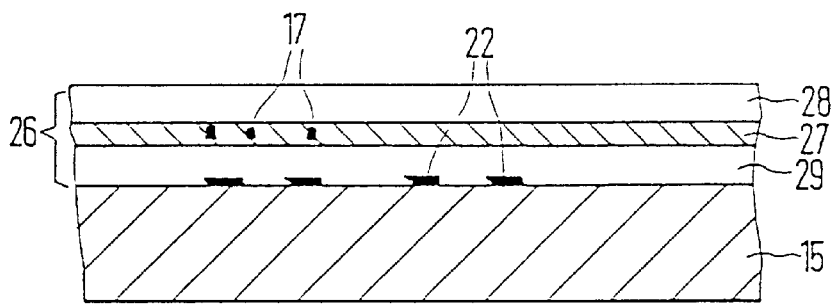

FIG. 10 shows a further card structure in which card base 15 is printed with printed data 22. The coextruded film is laminated on the card base and comprises three layers 27, 28 and 29 of which only layer 27 is provided with additives. Laser inscription 17 accordingly takes place only in layer 27. This structure has the advantage that separation layer 29 is added between print 22 and laser-sensitized layer 27, thereby preventing the compound between the card base and layer 26 located thereabove from being additionally impaired by the laser inscription.

Figure 11:
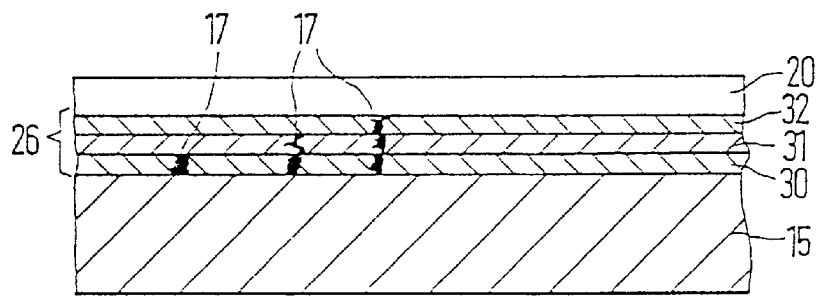

FIG. 11 shows an embodiment example in which coextruded film 26 comprises three layers 30, 31 and 32, whereby layer 30 has been sensitized for laser radiation most and layer 32 least. The different sensitizing makes it possible to inscribe one, two or all three layers with the laser beam, which leads to different depths of blackening. The number of inscribed layers depends only on the intensity of the laser beam used. This embodiment is particularly advantageous when different gray levels are to be produced, e.g. when continuous-tone images are to be incorporated in a card. The card inlay can furthermore bear a print (not shown), whereby it has proven favorable in this case if layer 26 to be inscribed is separated from the card inlay and the print thereon by a laser-insensitive layer, which is part of the coextruded film or an independent layer. Furthermore it is also possible to cover coextruded film 26 with additional layer 20 or to coextrude layer 20 simultaneously with layers 30 to 32.

Figure 12:
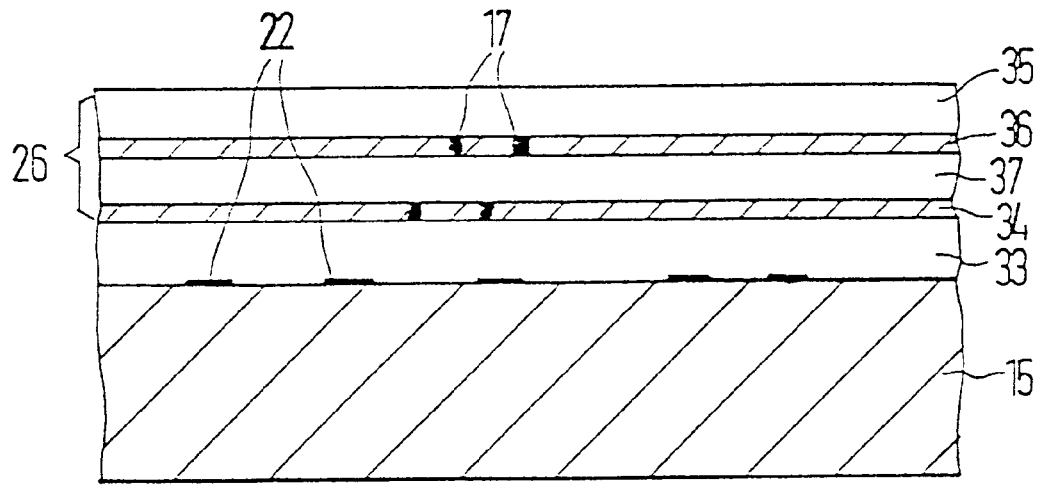

In FIG. 12 print 22 is applied to card inlay 15 and bears cover layer 33. A coextruded film containing two thin laser-sensitized layers 34 and 36 has been applied thereabove. The coextruded film likewise contains layers 35 and 37 which are made from the same or different materials. The same or different degrees of sensitization can be selected for the laser-sensitized layers, which generally have a thickness of 5 and 50 microns. It is furthermore also possible to include cover layer 33 in the coextrusion film compound so that it suffices to finish the card by simply laminating the coextruded film comprising layers 33 to 37 onto printed card inlay 15.

Figure 13:
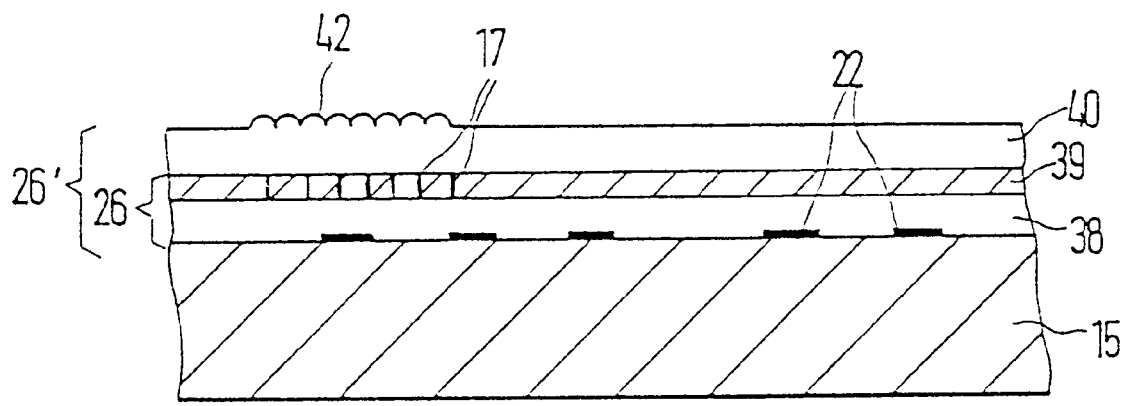

FIG. 13 shows card inlay 15 which can be provided with print 22. A coextruded film comprising layers 38, and 39 is laminated over tis card base. Layer 39 is designed as a laser-sensitized layer which is covered by layer 40 located thereabove and provided with lenticular screen pattern 41. The coextruded film can also be produced as film compound 26' so that it contains layers 38, 39 and 40, whereby layer 40 is subjected before or during lamination onto a card body to a treatment giving rise to lenticular screen pattern 41.

The latter embodiment examples show that a coextruded film containing a sensitized, thin and nonself-supporting layer can be used in a great variety of forms in a data carrier, whereby different effects are obtainable depending on the specific embodiment.

We claim:

1. A multilayer data carrier bearing general printed data, said data carrier having at least one opaque layer and at least one transparent layer, said transparent layer comprising a nonself-supporting layer which is thin compared to the other layers of the data carrier, said transparent layer containing additive which is absorbent for the energy of a laser beam, said transparent layer having visibly perceptible information incorporated therein in the form of thermal alteration of the transparent layer resulting from the absorption of laser beam energy, which alteration produces local changes in the optical properties of the layer.

2. The data carrier of claim 1, characterized in that the nonself-supporting layer contains at least one polymeric substance and has a thickness of 1 to 50 microns.

3. The data carrier of claim 1, characterized in that the nonself-supporting layer is located in the interior of the data carrier.

4. The data carrier of claim 3, characterized in that the nonself-supporting layer is covered by a transparent layer.

5. The data carrier of claim 4, characterized in that the transparent layer is printed on the side facing the nonself-supporting layer.

6. The data carrier of claim 1, characterized in that the printed data are applied to the opaque layer.

7. The data carrier of claim 1, characterized in that the nonself-supporting layer is a layer of lacquer.

8. The data carrier of claim 7, characterized in that a vehicle of the layer of lacquer is a polymeric substance of high molecular weight.

9. The data carrier of claim 7, characterized in that a vehicle of the layer of lacquer consists of a homopolymeric material.

10. The data carrier of claim 7, characterized in that a vehicle of the layer of lacquer comprises a copolymer, the comonomer of which has no plasticizer effects in the material.

11. The data carrier of claim 7, characterized in that the layer of lacquer is applied only in partial areas of the data carrier.

12. The data carrier of claim 7, characterized in that the layer structure of the data carrier has several superjacent layers of lacquer, layers of the lacquer containing either different additives or different amounts of additives.

13. The data carrier of claim 12, characterized in that the superjacent layers of lacquer are separated, in each case, by at least one transparent layer.

14. The data carrier of claim 7, characterized in that the layer of lacquer is formed from a lacquer that, with the exception of the additive, has the same chemical composition as a base polymer of a layer bordering the layer of lacquer.

15. The data carrier of claim 7, characterized in that the lacquer of the layer is a dispersion lacquer.

16. The data carrier of claim 7, characterized in that the lacquer of the layer is a coating powder.

17. The data carrier of claim 7, characterized in that the layer of lacquer comprises a mixture of two different lacquers.

18. The data carrier of claim 17, characterized in that one of the two lacquers, with the exception of the additive, has the same chemical composition as a base polymer of a layer bordering the layer of lacquer.

19. The data carrier of claim 8, characterized in that the vehicle is PVC with a K value of greater than 50.

20. The data carrier of claim 7, characterized in that the layer of lacquer is located above a porous layer.

21. The data carrier of claim 1, characterized in that the thin, nonself-supporting layer is part of a coextruded film.

22. The data carrier of claim 21, characterized in that the general printed data is printed on a layer of the data carrier and in that the nonself-supporting layer borders directly on the layer with the general printed data.

23. The data carrier of claim 21, characterized in that the coextruded film comprises the nonself-supporting layer and two further transparent layers, the nonself-supporting layer being located between said transparent layers.

24. The data carrier of claim 21, characterized in that the nonself-supporting layer comprises several individual layers provided with different, or different amounts of, additives.

25. The data carrier of claim 24, characterized in that the individual nonself-supporting layers are separated, respectively, by transparent layers.

26. The data carrier of claim 21, characterized in that the general printed data are applied to the surface of the thin, nonself-supporting layer.

27. The data carrier of claim 26, characterized in that the general printed data are transparent for the laser beam.

28. A lacquer for laser inscription in the data carrier of claim 3, characterized in that the solids content in the saturated solution of the lacquer is less than 20%.

29. The lacquer of claim 28, characterized in that the solids in the lacquer comprise plastics with a high degree of polymerization.

\* \* \* \* \*